United States Patent [19]
Gulistan

[11] 3,765,465
[45] Oct. 16, 1973

[54] RETRACTABLE CAPTIVE FASTENER
[75] Inventor: Bulent Gulistan, Malibu, Calif.
[73] Assignee: Deutsch Fastener Corp., Los Angeles, Calif.
[22] Filed: Jan. 5, 1972
[21] Appl. No.: 215,523

[52] U.S. Cl. .................................................. 151/69
[51] Int. Cl. .......................................... F16b 41/00
[58] Field of Search ....................................... 151/69

[56] References Cited
UNITED STATES PATENTS

| | | | |
|---|---|---|---|
| 3,583,461 | 6/1971 | Klaus | 151/69 |
| 1,251,676 | 1/1918 | McCaffray | 151/69 |
| 2,949,143 | 8/1960 | Shur | 151/69 |
| 2,972,367 | 2/1961 | Wootton | 151/69 |
| 3,080,184 | 3/1963 | Hays | 151/69 |

Primary Examiner—Edward C. Allen
Attorney—Richard F. Carr et al.

[57] ABSTRACT

A captive nut device including a sleeve having a head at one end and a thin-walled portion at the other adapted to be bent outwardly to cooperate with the head in holding the sleeve to a workpiece, the sleeve having an annular groove intermediate its ends which receives a resilient split ring, the ring bearing against a nut received in the sleeve, the nut having a tapered surface extending to a shoulder at one end which is engageable by the retainer ring to limit movement in one direction, the retainer ring producing a force component as a result of its engagement with the tapered surface to hold the shoulder against the retainer ring, the nut end being fully retracted within the sleeve when the retainer ring so engages the shoulder.

7 Claims, 5 Drawing Figures

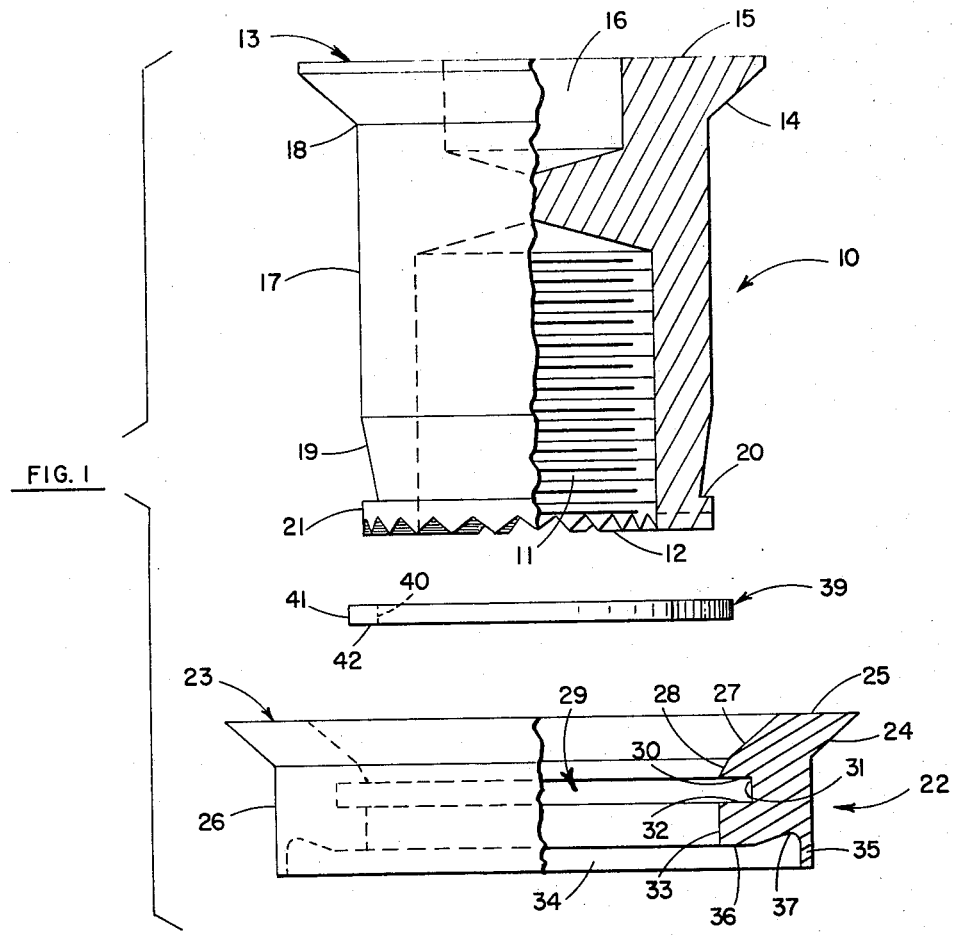
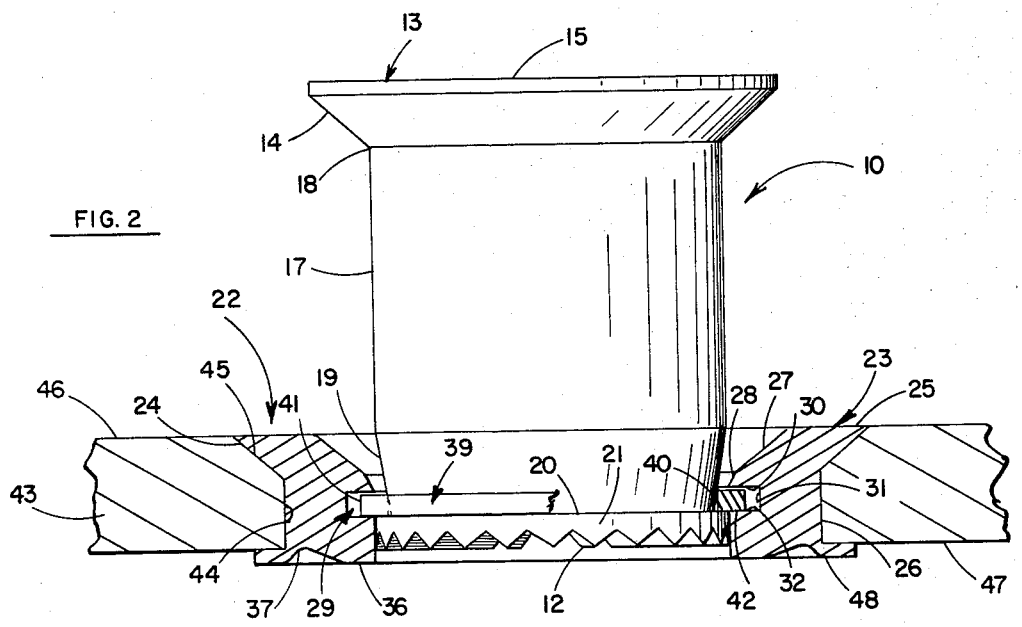

PATENTED OCT 16 1973

RETRACTABLE CAPTIVE FASTENER

BACKGROUND OF THE INVENTION

1. Field of the Invention

This invention pertains to captive fasteners.

2. Description of Prior Art:

Captive fasteners are widely used, one major area being in the retention of removable panels on aircraft. By being held to the panel, the captive fastener is always available for securing the panel back in place after it has been removed. Frequently, these captive fasteners are nuts which are axially movable in openings formed in the workpiece. A head at one end of the nut limits the movement of the nut in one direction. The nut is circumscribed by a split ring which can engage an external shoulder to prevent movement of the nut in the opposite direction out of the opening in the workpiece. Another form of retention by means of a split ring is shown in the prior art U.S. Pat. No. 3,343,581, although, in this instance, it is applied to a screw. In this design, the split ring is received in a groove in the interior surface of a projecting sleeve and can slide a substantial distance along an unthreaded portion of the shank of the screw.

In some instances, panels must be installed and removed primarily with sliding or lateral movement relative to the supporting structure. This occurs, for example, where curved panels are provided at the intakes for aircraft jet engines. A captive fastener of the type discussed above, after loosening, will drop downwardly relative to the panel with which it is associated, so that it projects beneath the undersurface of the panel. Consequently, it interferes with sliding or lateral movement of the panel as it is being installed or removed. Hence, such captive fasteners are not acceptable where this type of movement is required.

In some instances springs have been provided to retract captive fasteners, but springs add weight, bulk and complexity, and are subject to breakage. These spring-loaded captive fasteners are relatively long and will not permit a flush installation in the secured postion.

Another difficulty occurs because the retaining rings for the captive fasteners are exposed and vulnerable to being dislodged or broken as the panels are handled. Once a retainer ring has been knocked off the fastener, of course, it no longer can hold the fastener to the panel. Even more serious is the fact that the retainer ring may enter an area of a machine or item of equipment where it can cause damage. For panels used at the entrance to jet engines, a loose retainer ring may fall into the inlet duct of the engine and subsequently cause severe harm to the components of the engine.

SUMMARY OF THE INVENTION

The present invention overcomes the problems outlined above, providing a simplified captive fastener which can be held in a fully retracted position, and one in which the retainer ring will not become loosened. The device includes a sleeve or grommet which is adapted to be secured in an opening in the workpiece, such as an aircraft panel. The sleeve includes a flush head at one end and a thin-walled part at the other end, which is adapted to be bent outwardly to form a flange cooperating with the head to hold the sleeve in place. Intermediate its ends, the sleeve includes an annular groove which receives a resilient split ring having a free diameter less than the inside diameter of the sleeve. A nut is received in the sleeve, the nut having a head at one end having a frustoconical undersurface which can complementarily engage a corresponding surface at the head end of the sleeve. A frustoconical surface tapers toward a radial shoulder adjacent the opposite end of the nut. The threaded opening of the nut extends inwardly from that end. The nut is longer than the sleeve, and so may move axially relative to it. The head of the nut engages the sleeve to limit such movement in one direction. The split ring, bearing against the surface of the nut, will engage the shoulder of the nut and prevent the nut from separating from the sleeve in the opposite direction.

The parts are proportioned such that, when the split ring engages the shoulder, the end of the nut is fully retracted into the sleeve. In that position, therefore, there is no projecting portion of the nut to interfere with lateral movement of the panel. The inner surface of the split ring at that time bears against the tapered surface of the nut adjacent the shoulder. The compressive force exerted by the split ring against the frustoconical surface of the nut produces an axial force component which biases the nut axially in one direction so as to hold the shoulder of the nut against the split ring. Therefore, the nut is held by the split ring in the position where the end of the nut is fully retracted into the sleeve. The split ring performs the dual functions of preventing removal of the nut and of retaining the nut in the retracted position. Consequently, where several of the fasteners are used on a single panel, all may be held in the retracted position as the panel is installed and removed, so that the fasteners do not interfere with lateral movement of the panel.

Be being within a groove inside a sleeve and adjacent the nut at its inner edge, the retainer ring is buried and is not subject to engagement with external objects. It is securely and permanently held in the sleeve and will not become dislodged. Even if the retainer ring should become broken, it will not leave the groove and will stay within the sleeve. As a result, the retainer ring will never enter an area, such as an engine intake duct, where it can cause damage.

BRIEF DESCRIPTION OF THE DRAWINGS

FIG. 1 is an exploded elevational view, partially in section, of the nut, grommet and retainer ring of this invention;

FIG. 2 is a side elevational view, partially in section, showing the nut received in the grommet and held in a retracted position, with the grommet attached to a panel;

DESCRIPTION OF THE PREFERRED EMBODIMENT

Figures 3, 4, 5:
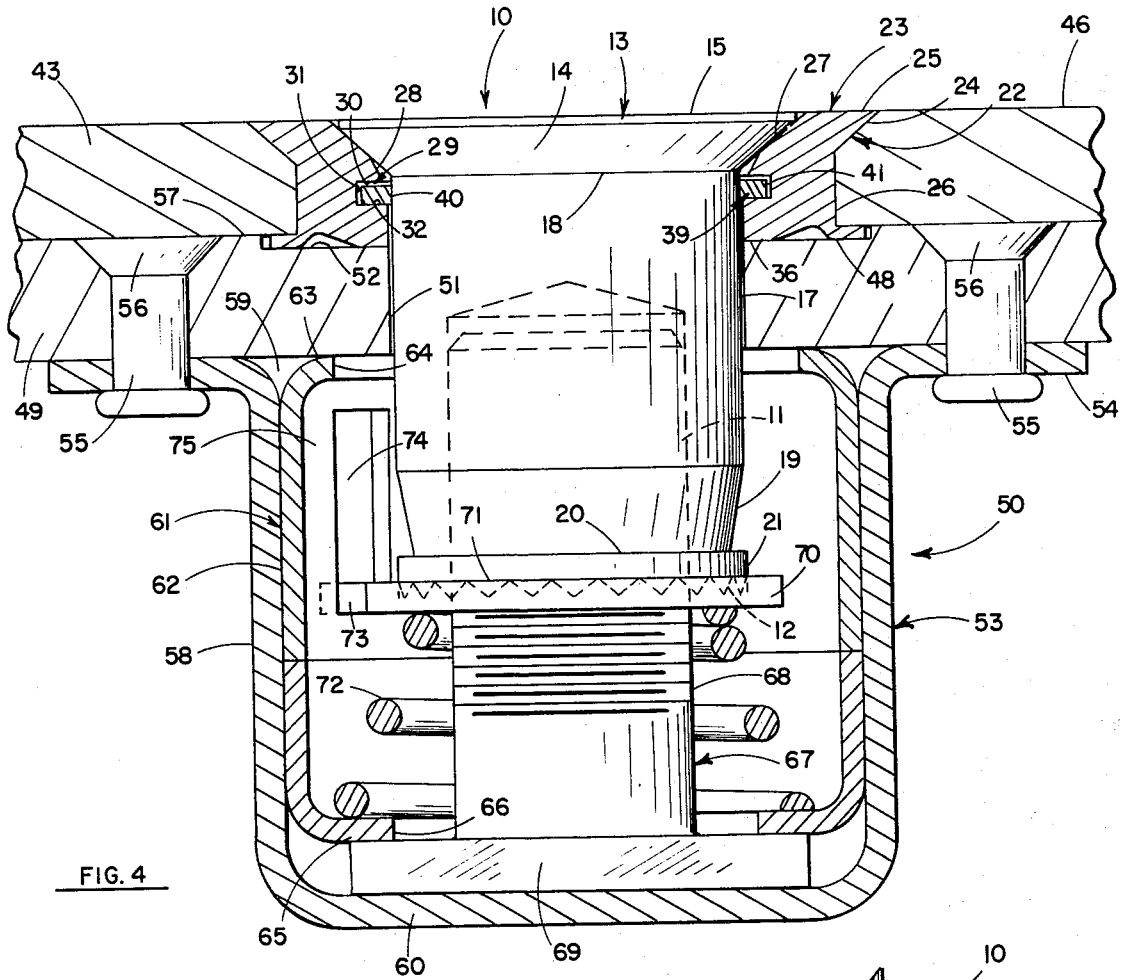
FIG. 3 is a plan view of the retainer ring.
FIG. 4 is a longitudinal sectional view, partially in elevation, showing the fasterner in the fully mated position.
FIG. 5 is an enlarged fragmentary sectional view showing the action of the retainer ring in holding the nut in the retracted position.

The nut 10 shown in FIG. 1 includes a blind tapped axial opening 11 extending inwardly from one end 12. The nut 10 is of the general type shown in U.S. Pat. No. 3,192,980, with the end 12 being serrated, defining shallow radially extending teeth. At the opposite end of the nut 10 is a head 13 having a frustoconical undersurface 14 and a flat outer end surface 15. In the central part of the head 13 is a driving recess 16. The exterior surface 17 of the nut that connects to the frustoconical undersurface 14 of the head 13 is cylindrical and extends the major portion of the length of the nut. In manufacturing the nut, a slight radius necessarily is produced at the corner 18 where the cylindrical surface 17 connects to the undersurface 14 of the head. The outer end of the surface 17 connects to a tapered surface 19, which is frustoconical in configuration and is at a shallow angle relative to the axis of the nut 10. At the apical end of the surface 19 is a radial shoulder 20 which is close to the outer end 12 of the nut. Beyond the shoulder 20 is a short cylindrical surface 21, which has the same diameter as that of the surface 17.

The nut 10 is adapted to fit within a sleeve or grommet 22, at one end of which is a head 23 having a frustoconical undersurface 24 and a radial outer end surface 25. A cylindrical exterior surface 26 connects to the undersurface 24 of the head 23 and extends to the opposite end of the grommet 22.

The bore through the grommet 22 includes a frustoconical surface 27 that extends inwardly from the end 25 of the head 23, tapering in diameter inwardly. The inner end of the surface 27 connects to a second frustoconical surface 28, which has a more shallow taper than that of the surface 27. An annular groove 29 at the intermediate portion of the grommet 22 has a radial wall 30 that connects to the inner end of the tapered surface 28. The groove 29 also includes a circumferential surface 31 and a second radial wall 32 opposite from the wall 30. Beyond the annular groove 29 is a short cylindrical surface 33, dimensioned so that it can substantially complementarily receive the surfaces 17 and 21 of the nut. An enlarged cylindrical counterbore 34 extends inwardly from the outer end of the grommet, resulting in a thin-walled portion 35 at the end of the grommet. At the inner end of the counterbore 34 is a radial wall 36 which connects at its outer edge to a groove 37 which extends axially inwardly a short distance from the radial wall 36. The shallow groove 37 is arcuate in contour and extends to the circumferential wall of the counterbore 34 at the thin-walled portion 35.

Prior to introducing the nut 10 into the grommet 22, a split resilient retainer ring 39 is fitted into the annular groove 29. The inside diameter of the ring 39 in its free position is less than that of the diameter of the surface 33 of the bore of the grommet 22. Therefore, when the ring 39 is fitted into the groove 29, its inner circumferential edge 40 is inward of the wall of the bore, whereas its outer circumferential edge 41 is between the radial walls 30 and 32 of the groove 29 which hold the ring against axial movement. The radial thickness of the ring 39, between the circumferential surfaces 40 and 41, is no greater than the depth of the groove 29. Consequently, the ring 39 can be expanded so that it is entirely received within the groove 29 and does not project inwardly past the surface 33 of the bore. This allows the nut 10 to be moved into the sleeve 22 after the ring 39 has been installed in the groove 29. The free inside diameter of the ring 39 is less than that of the nut, including its tapered surface 19, so that when the ring is released its inner edge 40 bears against the periphery of the nut 10 and exerts a compressive force. When the nut 10 is moved axially relative to the grommet 22, the ring 39 slides along the surface of the nut. The nut 10 cannot be removed from the grommet by moving it upwardly from the position shown in FIG. 2 because the shoulder 20 of the nut will engage the outer radial surface 42 of the ring 39, acting as an abutment to preclude such separation. The nut head 13 prevents separation in the other direction. With the nut 10 being longer than the grommet 22, the nut can move axially for a limited distance as determined by the positions of the nut head 13 and the shoulder 20.

With the nut 10 received in the grommet 22, the latter member may be secured to a workpiece, such as a panel 43. An opening 44 is provided in the panel 43, substantially complementary to the cylindrical surface 26 of the grommet 22. In addition, a spot face 45, complementary to the undersurface 24 of the head 23 of the grommet, is formed at one end of the cylindrical opening 44. The grommet 22 is fitted into the opening in the panel 43 so that the head 23 is entirely received within the spot face 45 and the end 25 of the grommet is flush with the outer surface 46 of the panel. The parts are proportioned such that the thin-walled portion 35 of the grommet 22 then extends beyond the opposite surface 47 of the panel 43. This portion of the grommet is bent outwardly to form a radial flange 48 which cooperates with the head 23 in securely holding the grommet 22 to the panel 43. When the flange 48 is formed, it is substantially flush with the radial surface 36 of the grommet 22. The flange 48 also protrudes very little past the surface 47 of the panel 43, so that the grommet 22 is almost flush with the workpiece at that end as well as the other.

The nut 10 then may be used in securing the panel 43 to an adjoining part, such as the member 49 shown in FIG. 4. Normally, there will be several nuts 10 used in holding the panel 43 to the member 49. The fastener assembly 50, attached to the member 49 for mating with the nut 10, is of the type shown in U.S. Pat. No. 3,192,980. The member 49 is given an opening 51 through which the nut 10 can extend, while a shallow counterbore 52 can receive the outwardly bent flange 48. Secured to the opposite side of the member 49 is a cage 53, which has outwardly projecting flanges 54 at one end, through which extend rivets 55 used in securing the cage to the member 49. The rivets 55 have flush heads 56 at the surface 57 of the member 49 adjacent the panel 43.

The sidewalls 58 of the cage 53 define a substantially square receptacle having an open end 59 adjacent the member 49 and a wall 60 closing the opposite end. Within the cage 53 is a two-piece receptacle 61 having sidewalls 62 complementary to the sidewalls 58 of the cage 53. The end 63 of the receptacle 61 has a circular opening 64, while the opposite end wall 65 is spaced from the wall 60 of the cage 53 and provided with a circular opening 66. A stud 67 has a threaded shank 68 that extends through the opening 66 from a flat square head 69. The head 69 is held loosely between the walls 65 and 60, so that it is permitted limited lateral movement, while the square sides of the head 69 prevent substantial rotation of it.

Around the shank 68 is a plate or washer 70, which has square sides and teeth on its outwardly facing surface 71. A compression spring 72 bears against the opposite surface of the plate 70, biasing it toward the end 63 of the inner receptacle 61. A tab 73 extends from one corner of the plate 70 and into a longitudinal slot 74 in a flattened corner 75 of the inner receptacle 61. This holds the plate 70 against substantial rotation relative to the inner receptacle 61, but allows the plate floating movement laterally.

In the secured position of the fastener, the threaded shank 68 of the stud 67 is received in the opening 11 of the nut. The serrated end wall 12 of the nut 10 is engaged by the similar serrations on the surface 71 of the plate 70, which is held against the nut by the spring 72. When the nut is being rotated, its teeth slide across the teeth of the plate 70. When the fastener is fully tightened, the interengaging teeth of the plate 70 and the nut 10 provide a locking effect which will not permit the nut to be loosened from vibrational forces or other service conditions.

In the fully secured position of the fastener, the outer surface 15 of the nut head 13 is substantially flush with the outer surface 25 of the grommet 22 and with the surface 46 of the panel 43. The shallow taper 28 in the interior of the grommet provides a clearance for the slight radius at the corner 18 of the nut, so that there is no interference with movement of the nut head 13 entirely into the grommet.

When the panel 43 is to be separated from the member 49, the nut 10 is rotated in the reverse direction to disengage the stud 67. As this occurs, the teeth of the plate 70 and of the nut 10 slide relative to each other until the nut has left the inner receptacle 61. As the nut 10 moves out of the receptacle 61 and disengages the shank 68, it will have been shifted axially to a position where its head 13 projects outwardly beyond the end 25 of the grommet 22. The nut then may be pulled axially outwardly until the radial shoulder 20 on the periphery of the nut engages the retainer ring 39, as shown in FIG. 2. The inner edge 40 of the ring 39 at that time bears against the tapered surface 19 of the nut adjacent the shoulder 20. With the surface 19 tapering toward the shoulder 20, the reaction of the compression of the ring 39 on the surface 19 produces an axial force component which biases the shoulder 20 against the outer radial surface 42 of the ring 39. Consequently, once the nut is so positioned, its tapered part 19 acts as a cam surface, and the ring 39 holds the nut in the elevated position. When retracted in this manner, the end 12 of the nut 10 will have been moved past the transverse end surface 36 of the grommet 22, and so is entirely received within the grommet. This occurs because the shoulder 20 is near the end 12 of the nut, and the ring 39 is positioned between the ends of the grommet 22. Therefore, the nut 10 is retained in a position where its end 12 is remote from the opening 51 and the surface 57 of the member 49. The nut 10 then will not interfere with movement between the members 43 and 49, even if this is relative lateral sliding motion. Where the panel 43 is curved, or due to other circumstances, it may be necessary to impart relative lateral movement between the parts 43 and 49 as they are separated, complete retraction is essential. Even with the use of a substantial number of fasteners on the panel 43, each may be kept fully retracted by its retainer ring so as to not interfere with sliding movement.

Furthermore, the ring 39 will hold the nut 10 sufficiently far above the surface 46 of the panel 43 so that it is instantly apparent, upon visual inspection, that the nut is loosened. This is a safety feature which helps avoid inadvertently leaving one of a plurality of nuts unsecured when the panel 43 is reattached to the structure 49.

A further advantage from this design lies in the fact that the retainer ring 39 is permanently retained within the groove 29. It cannot be dislodged by being knocked off by striking another object or from vibrational forces. Even if the ring 39 should become broken, it cannot get out of the groove 29 because the nut 10 is adjacent to it. Therefore, adjacent machinery or equipment will not be endangered by a loose retaining ring dislodged from the fastener.

The foregoing detailed description is to be clearly understood as given by way of illustration and example only, the spirit and scope of this invention being limited solely by the appended claims.

I claim:
1. A fastener comprising
   a sleeve adapted to fit within an opening in a workpiece, said sleeve having
      a head at one end,
      a bore extending inwardly from said one end,
      an annular groove intermediate the ends of said bore,
      a counterbore extending inwardly from the opposite end of said sleeve,
         thereby providing a relatively thin-walled portion of said sleeve at said opposite end adapted to be bent outwardly to overlap the surface of a workpiece for cooperating with said head of said sleeve in holding said sleeve to said workpiece,
   and a transverse surface interconnecting said bore and said counterbore,
      said transverse surface having a first substantially radial portion and a second recessed portion defined by an axially inwardly extending groove extending to said relatively thin-walled portion of said sleeve,
         whereby said relatively thin-walled portion is adapted to be so bent outwardly to assume substantial alignment with said substantially radial portion of said transverse surface,
   a nut received in said sleeve,
      said nut being longer than said sleeve and axially movable relative thereto,
      said nut including a head at one end engageable with said sleeve for limiting the relative axial movement of said nut in one direction,
      said nut having an axial threaded opening extending inwardly from the opposite end thereof, said nut having an exterior shoulder adjacent said opposite end thereof,
      and a tapered surface having its apical end adjacent said shoulder and extending inwardly therefrom,
   and a resilient split ring in said annular groove,
      said ring having a free inside diameter less than the diameter of said tapered surface adjacent said shoulder,
         whereby said ring is engageable with said shoulder for limiting the axial movement of said nut relative to said sleeve in the opposite direction, and simultaneously engageable with said tapered surface for biasing said nut to a position where said shoulder is so engaged by said ring.

2. A device as recited in claim 1 in which said opposite end of said nut is inwardly of said substantially radial portion of said transverse surface when said ring engages said shoulder.

3. A device as recited in claim 1, in which said nut is of a length relative to said sleeve such that said head of said nut is spaced outwardly from said sleeve when said shoulder is in engagement with said ring.

4. A device as recited in claim 1 in which
   said sleeve includes a frustoconical inner surface adjacent said one end thereof,
   said head of said nut having a frustoconical undersurface substantially complementarily engageable with said frustoconical inner surface of said sleeve, whereby said head of said nut is substantially flush with said one end of said sleeve when said undersurface so engages said frustoconical inner surface of said sleeve.

5. A fastener comprising
   a sleeve, said sleeve having
     a head at one end,
       said head having a substantially radial outer surface and a frustoconical undersurface, and a cylindrical outer surface extending from said head to the opposite end of said sleeve,
     a bore extending inwardly from said one end defined by a substantially frustoconical surface adjacent said one end,
     a substantially cylindrical surface axially inwardly of said substantially frustoconical surface thereof, an annular groove intermediate said substantially frustoconical surface and said substantially cylindrical surface of said bore,
     a substantially cylindrical counterbore extending inwardly from said opposite end thereof,
       thereby providing a relatively thin-walled portion of said sleeve at said opposite end adapted to be bent outwardly to overlap the surface of a workpiece for cooperating with said head of said sleeve in holding said sleeve to such a workpiece,
     and a transverse surface interconnecting said counterbore and said bore,
     said transverse surface having a first substantially radial portion adjacent said bore and having a second recessed portion defined by a relatively shallow groove extending axially inwardly of said substantially radial portion and to said relatively thin-walled portion of said sleeve,
   a nut, said nut having
     a head at one end thereof,
       said head of said nut having a radial outer surface, a first frustoconical undersurface, and a driving recess extending inwardly from said outer surface thereof,
       said first frustoconical undersurface of said head of said nut being substantially complementarily engageable with said substantially frustoconical surface of said bore, with said outer surface of said head of said nut then being substantially flush with said outer surface of said head of said sleeve,
     a cylindrical surface extending from said undersurface of said head of said nut to a location adjacent the opposite end of said nut,
     a second frustoconical surface tapering from said location toward said opposite end thereof,
     a substantially radial shoulder extending outwardly from the apical end of said second frustoconical surface,
     a relatively short substantially cylindrical surface extending from said substantial radial shoulder to said opposite end thereof,
     and a threaded opening extending axially inwardly from said opposite end thereof,
   and a resilient split ring,
     said ring having outer portions received in said annular groove,
     said ring having a free diameter less than that of said second frustoconical surface of said nut and having an inner surface bearing against the exterior of said nut,
     said ring having a radial surface engageable with said substantially radial shoulder while said inner surface of said nut engages said second frustoconical surface of said nut,
       whereby said ring produces a force tending to hold said substantially radial shoulder of said nut in engagement with said substantially radial surface of said ring,
     said opposite end of said nut being entirely received within said sleeve when said substantially radial shoulder so engages said radial surface of said ring.

6. A device as recited in claim 5 in which said bore of said sleeve includes a second substantially frustoconical surface extending between said first-mentioned substantially frustoconical surface of said bore and said annular groove.

7. In combination with a movable member for attachment to another part, said member having an opening between a first surface and a second surface thereof, said opening adjacent said first surface being defined by a frustoconical surface, a fastener comprising
   a sleeve within said opening, said sleeve having
     a head at one end,
       said head having a frustoconical undersurface engaging said frustoconical surface of said opening,
     a bore extending inwardly from said one end, an annular groove intermediate the ends of said bore, and an opposite end including
       a first surface extending substantially radially outwardly from said bore,
       a radial flange substantially aligned with said first surface and overlapping said second surface of said member for cooperating with said head of said sleeve in attaching said sleeve to said member,
       and an axially inwardly extending arcuate groove intermediate said first surface of said opposite end and said flange,
   a nut received in said sleeve,
     said nut being longer than said sleeve and axially movable relative thereto,
     said nut including a head at one end engageable with said sleeve for limiting the relative axial movement of said nut in one direction,
     said nut having an axial threaded opening extending inwardly from the opposite end thereof,
     said nut having an exterior shoulder adjacent said opposite end thereof,
     and a tapered surface having its apical end adjacent said shoulder and extending inwardly therefrom,
   and a resilient split ring in said annular groove, said ring having a free inside diameter less than the diameter of said tapered surface adjacent said shoulder, whereby said ring is engageable with said shoulder for limiting the axial movement of said nut relative to said sleeve in the opposite direction, and simultaneously engageable with said tapered surface for biasing said nut to a position where said shoulder is so engaged by said ring.

* * * * *